(12) United States Patent
Scheidling et al.

(10) Patent No.: US 6,499,909 B1
(45) Date of Patent: Dec. 31, 2002

(54) QUICK FASTENER WITH TORSION SPRING

(75) Inventors: Matthias Scheidling, Freiberg (DE); Grant A. Webb, Howell, MI (US); Arnd Bürger, Einbeck (DE)

(73) Assignee: United Parts FHS Automobil Systeme GmbH, Dassel (DE)

( * ) Notice: Subject to any disclaimer, the term of this patent is extended or adjusted under 35 U.S.C. 154(b) by 0 days.

(21) Appl. No.: 09/440,900

(22) Filed: Nov. 16, 1999

(30) Foreign Application Priority Data

Nov. 16, 1998 (DE) .................................. 198 52 731.4

(51) Int. Cl.⁷ ............................................. F16C 1/10
(52) U.S. Cl. ..................................... 403/351; 74/502.4
(58) Field of Search .................................. 403/351, 348, 403/349, 345, 104, 106, 110; 74/502.4, 501.5 R, 502.6, 502; 192/111 A, 111 R, 85 R

(56) References Cited

U.S. PATENT DOCUMENTS

| | | | | |
|---|---|---|---|---|
| 5,347,882 A | * | 9/1994 | Klotz ......................... | 74/502.4 |
| 5,383,377 A | * | 1/1995 | Boike ......................... | 74/502.4 |
| 5,448,926 A | * | 9/1995 | Reasoner ..................... | 74/502 |
| 5,884,531 A | * | 3/1999 | Koenig ....................... | 74/502.4 |
| 6,000,516 A | * | 12/1999 | Teichert et al. ........... | 192/85 R |
| 6,105,458 A | * | 8/2000 | Gomila et al. ............. | 74/502.4 |
| 6,189,408 B1 | * | 2/2001 | Scheidling et al. ........ | 74/502.4 |

FOREIGN PATENT DOCUMENTS

| | | |
|---|---|---|
| DE | 35 23 986 | 1/1986 |
| DE | 93 06 761 | 8/1993 |
| DE | 197 02 777 | 7/1998 |
| EP | 0 703 395 | 3/1996 |
| EP | 0 790 418 | 8/1997 |
| WO | WO 98/32978 | 7/1998 |

* cited by examiner

Primary Examiner—Anthony Knight
Assistant Examiner—Doug Hutton
(74) Attorney, Agent, or Firm—Cohen, Pontani, Lieberman & Pavane

(57) ABSTRACT

A quick fastener with a torsion spring, wherein a pressure piece has a wedge-shaped ramp contour which engages in a housing having a wedge-shaped ramp contour, and wherein the torsion spring is arranged between the pressure piece and the housing so that it holds both parts closed.

12 Claims, 3 Drawing Sheets

QUICK FASTENER WITH TORSION SPRING

BACKGROUND OF THE INVENTION

1. Field of the Invention

The invention is directed to a quick fastener with a torsion spring for actuating pulls, and particularly to actuating pulls in motor vehicles.

2. Discussion of the Prior Art

Quick fasteners are used in mechanical cables of Bowden pulls in which fastening to a fixing point between the cable and a part of a motor vehicle must be carried out quickly.

European reference EP 0 790 418 A1 discloses a quick fastener in which a spiral spring with a plurality of turns located one behind the other is arranged between a pressure piece and a housing, wherein the pressure piece and housing can be connected with one another by a screw thread. Apart from the costly manufacture for the thread, which requires exact threading of the parts one inside the other, there is also an increased space requirement for accommodating the spring and for unscrewing the thread.

European reference EP 0 703 395 A2 discloses a quick fastener system in which a spring with turns located one behind the other likewise requires a large amount of space and two toothings mesh with one another in the desired position of the pressure piece and closure piece. Although the manner in which the teeth engage with one another results in a space-saving device, there is an increased space requirement due to the presence of a spring with spring turns located one behind the other. When disassembling the device, problems result due to the arrangement of the spring on the side opposite the thread. Further, there are two threads which must be operated. Therefore, in addition to a large space requirement, handling during installation and removal is disadvantageous.

WO 98/329 78 A1 discloses a quick fastener in which a spring which is formed by a housing part provides for the required contact pressing pressure and guide projections engage on two sides in recesses of a closing part. The guide projections are wedge-shaped and accordingly enable a locking of the connection parts. This locking cannot be carried out automatically by a spring. Further, the construction of this part is complicated and handling is not easy, especially in devices or motor vehicles having little available space, because installation and locking cannot be carried out in one work step. Further, this quick fastener is not suitable for connections with a small space requirement.

SUMMARY OF THE INVENTION

Therefore, it is an object of the present invention to provide a quick fastener in which it is possible to fasten actuating pulls, possibly only from one side, quickly and securely without preorientation of the torsion piece and closure piece in an economical manner with respect to installation and space.

Fasteners of the present invention can be applied wherever quick fasteners with a small space requirement, simple manufacture and handling and small overall height are required, and wherein these quick fasteners are to be installed and removed only from one side.

The quick fastener according to the invention comprises a damping rubber which encloses and connects an injection molding with a longitudinal or elongated wire and a cable sleeve with a guide tube. The damping rubber may be constructed in various ways and made from various materials. According to the invention, it is surrounded by a housing and a closure piece and held together in such a way that the guide tube and cable sleeve cannot be detached.

A movable pressure piece is arranged on the housing. This movable pressure piece engages in a wedge-shaped ramp contour of the housing and can accordingly be fixedly connected with the housing, which is effected by means of torsion springs between the housing and the pressure piece. The side remote of the torsion spring and ramp contour of the pressure piece presses by spring force against the abutment to which the quick fastener is fastened.

At the other side of the abutment, a closure piece is arranged at the quick fastener and acts against the abutment by its collar, holds the damping rubber securely in its interior and locks into a recess in the housing by its snap-in projections and is accordingly securely connected with it. To fasten the quick fastener to the abutment, the pressure piece need only be turned against the spring force and pulled back proceeding from one side. In order to facilitate this process for the user, a spacer can be inserted between the closure piece and the pressure piece in place of the abutment prior to mounting, wherein the spacer falls out by pressing on the abutment.

The quick fastener according to the invention can be mounted quickly, simply and in a space-saving manner from one side with little effort.

It is important to the invention that at least two ramp contours are arranged on the pressure piece and the housing. Of course, it is also possible to arrange only one ramp contour or more than two ramp contours. A torsion spring is arranged between the pressure piece and the housing in such a way that the pressure piece is pretensioned such that it is supported at the ramp contour or at the housing and an axial movement can therefore be carried out. Accordingly, the parts can be disengaged by means of a simple rotating movement of the closure piece or housing relative to the pressure piece, so that the spring is tensioned. A quick, secure and user-friendly pretensioning of the parts relative to one another, wherein a fastening to the abutment is carried out, is effected by means of the force of the tensioned spring which screws tight the parts relative to one another to the extent allowed by the ramp-shaped contour at the end sides which limit these movements.

In a further embodiment of the invention the pressure piece has a rough contour on its surface. This can be carried out by means of a surface coating, for example, with rubber or plastic, or by means of a simple roughening of the surface. A more reliable and simple handing is made possible for the user by means of this rough contour.

In still another embodiment of the invention the pressure piece, closure piece, housing, guide tube and/or guide bushing are made of plastic. This achieves a reduction in weight and simplifies manufacture.

In yet a further embodiment the cable sleeve is injection-molded directly and the elongated wires are bent for the positive engagement.

The guide tube can also be injection-molded directly on the cable sleeve.

Another embodiment of the invention provides the damping rubber constructed in two parts.

In still another embodiment of the invention the guide tube is joined in the front damping rubber and a guide bushing is arranged between the guide tube and injection molding.

Further, it is advantageous that the injection molding and guide tube are injection-molded in one work step.

Still further, it is advantageous that the damping rubber is injection-molded on the injection molding, cable sleeve and guide tube.

The system is arranged so as to ensure accessibility from the cable side and so as to facilitate disassembly in case of servicing.

The ends of the torsion spring engage in the pressure piece on the one hand and in the housing on the other hand. In this way, the torsion spring has a minimum space requirement. Also, there is only a small space requirement for the wedge-shaped toothings. This results in a device in which there is no need for preorientation of the pressure piece and housing, so that assembly is facilitated.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
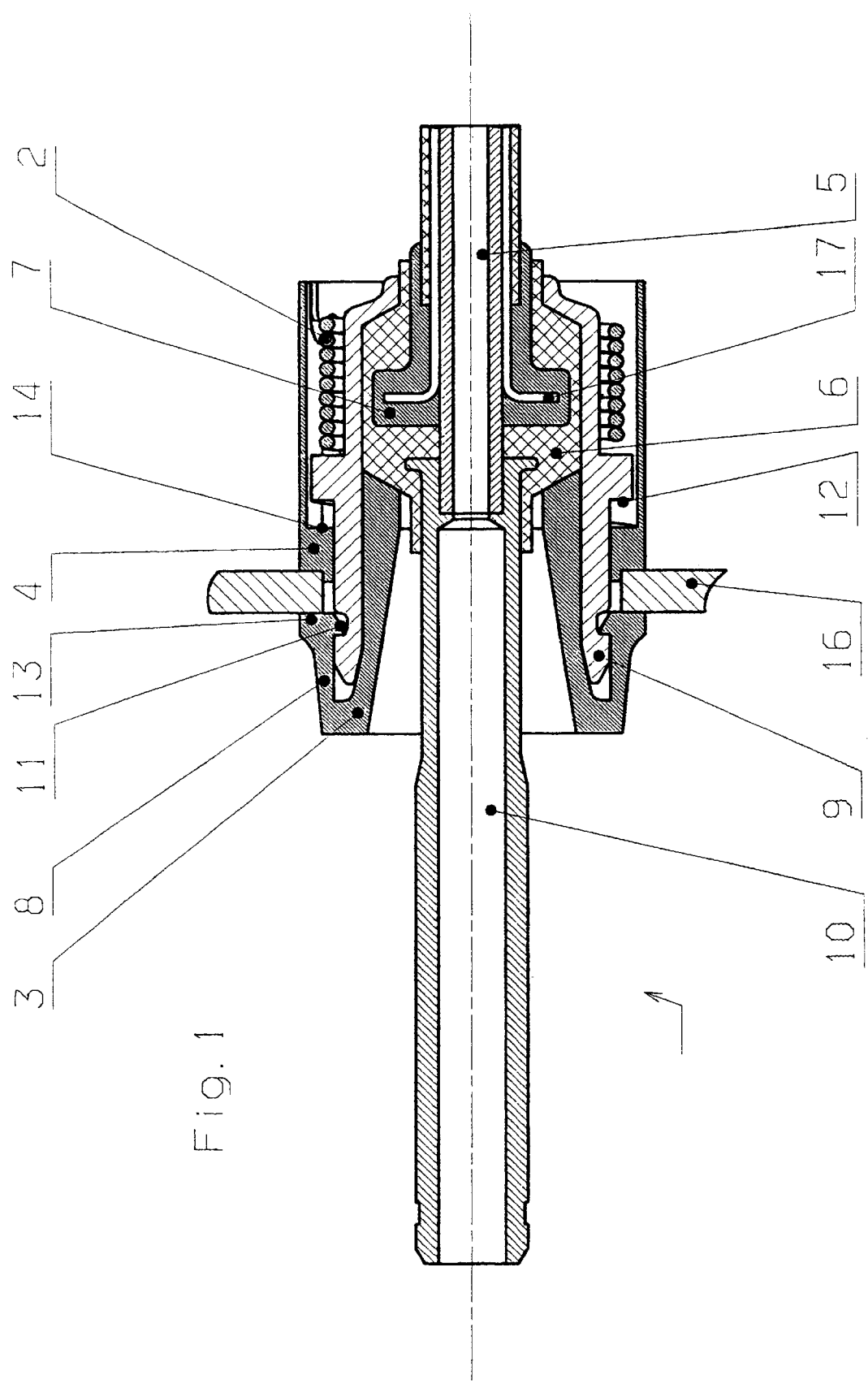
FIG. 1 is a sectional view of the quick fastener according to the invention, wherein the guide tube is injection-molded directly on the cable sleeve.

FIG. 1 shows the quick fastener 1, according to the invention, in section, wherein the guide tube 10 is injection-molded directly on a cable sleeve 5. An elongated wire 17 of the cable sleeve 5 is bent and is enclosed by an injection molding 7. The end of the guide tube 10 and the end of the cable sleeve 5 with the injection-molding 7 are enclosed and held together by a damping rubber 6. The damping rubber 6 is surrounded by a housing 9 and by a closure piece 3. The housing 9 and the closure piece 3 are held together by a snap-in projection 11 at a clip 8, wherein the snap-in projection 11 is clipped into a recess in the housing 9. A collar 13 of the closure piece 3 acts against an abutment 16 to which the quick fastener 1 is fastened. On the other side of the abutment 16, a pressure piece 4 acts against the abutment 16. The pressure piece 4 is arranged on the housing 9 so as to be movable in such a way that it can be rotated against the abutment of a torsion spring 2 and pulled back in order to open the connection. Wedge-shaped ramp contours 12, 14 are arranged between the pressure piece 4 and the housing 9, wherein the pressure piece 4 is supported between the housing 9 and can be drawn tight against the abutment by means of these wedge-shaped ramp contours 12, 14. The torsion spring 2 is arranged between the housing 9 and the pressure piece 4 in such a way that its ends project into the pressure piece 4 on one side and into the housing 9 on the other side, so that both can work against each other. Prior to mounting the quick fastener 1, a spacer is arranged between the closure piece 3 and the pressure piece 4 in place of the abutment 16, wherein the spacer is pressed out when mounted on the abutment 16, which enables an extremely quick installation.

Figure 2:
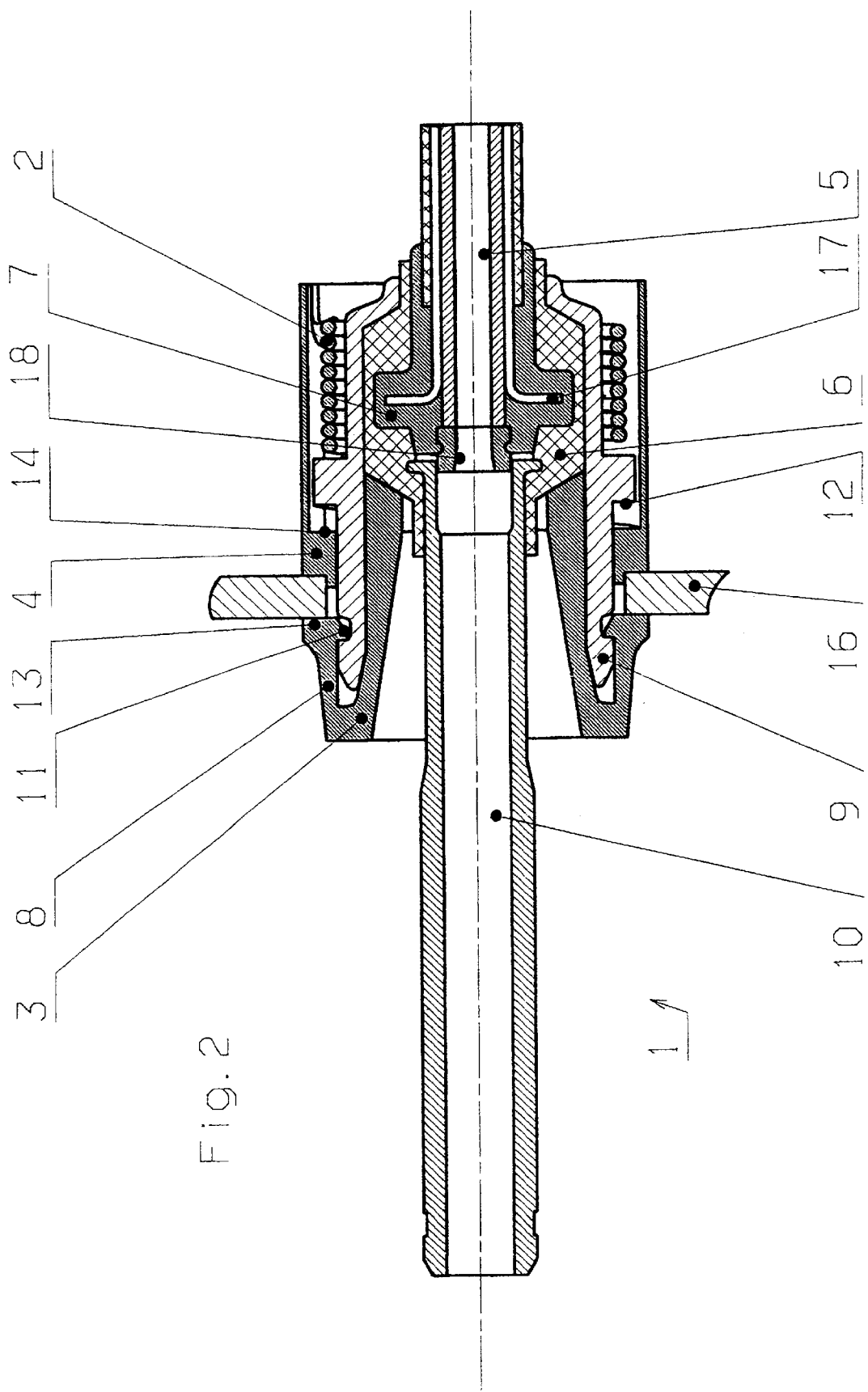
FIG. 2 shows a quick fastener according to the invention with a two-part damping rubber.

FIG. 2 shows another arrangement of the connection between the guide tube 10 and the cable sleeve 5, wherein a guide bush 18 has been inserted for connecting the two parts. The damping rubber 6 is constructed in two parts, so that it can be folded on both sides over the parts 17, 7, 5, 10 to be connected after the guide bush 18 is mounted.

Figure 3:
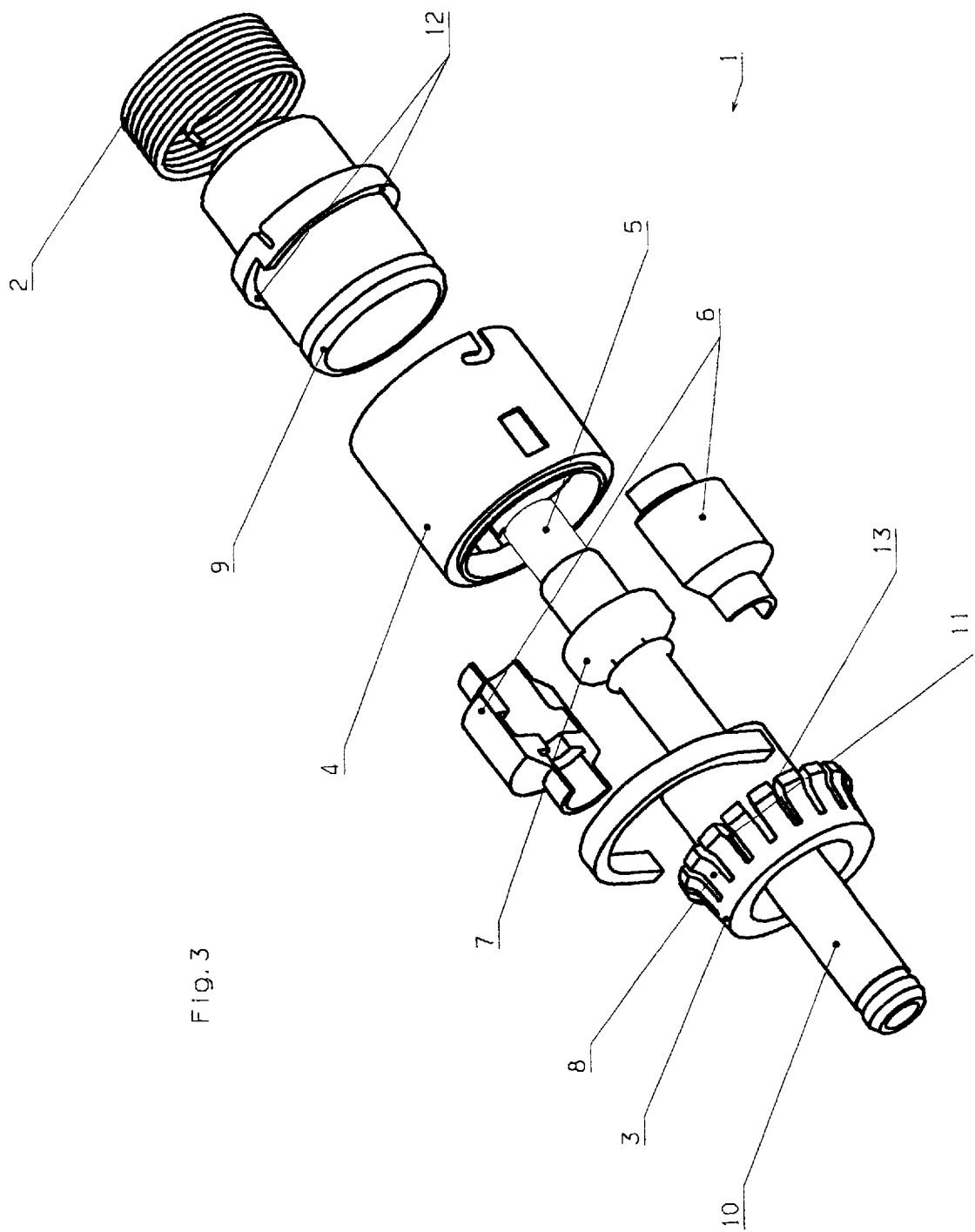
FIG. 3 is an exploded view of the quick fastener according to the invention.

FIG. 3 is an exploded view of the quick fastener 1 showing its individual parts. The quick fastener 1 according to the invention has the advantage that it can be mounted and disassembled quickly, in a space-saving manner and easily from only one side, in the illustrated case from the right-hand side.

The invention is not limited by the embodiments described above which are presented as examples only but can be modified in various ways within the scope of protection defined by the appended patent claims.

We claim:

1. A quick fastener for actuating pulls, comprising:
    a housing having a wedge-shaped ramp contour;
    a pressure piece movably arranged on the housing and having a first side with a wedge-shaped ramp contour that is lockable with the ramp contour of the housing;
    a torsion spring arranged between the housing and the pressure piece so as to lock the ramp contour of the pressure piece with the ramp contour of the housing;
    a damping rubber;
    an injection molding having an elongated wires and a cable sleeve;
    a guide tube; and
    a closure piece, the closure piece, the housing and the pressure piece being arranged to secure an abutment, a second side of the pressure piece being engagable with one side of the abutment, the closure piece having a clip with a collar that acts on another side of the abutment in a closed state of the closure piece and further has a projection that snaps into a recess in the housing, the housing and the closure piece being arranged to enclose the damping rubber, the damping rubber being arranged to enclose and connect the guide tube and the injection molding.

2. A quick fastener according to claim 1, wherein the guide tube is joined to the damping rubber, and further comprising a guide bush arranged between the guide tube and the injection molding.

3. A quick fastener according to claim 1, wherein the guide tube is connected at its end with the damping rubber in a positive engagement.

4. A quick fastener according to claim 1, wherein at least two wedge-shaped ramp contours are provided on the pressure piece and the housing.

5. A quick fastener according to claim 1, wherein the pressure piece has a rough contour on its surface.

6. A quick fastener according to claim 1, wherein the torsion spring is anchored by its ends in holes located in the pressure piece and the housing.

7. A quick fastener according to claim 1, wherein the cable sleeve is injection-molded directly and the elongated wires are bent to form a positive engagement.

8. A quick fastener according to claim 1, wherein the guide tube is injection-molded directly to the cable sleeve.

9. A quick fastener according to claim 1, wherein the damping rubber is constructed in two parts.

10. A quick fastener according to one of claim 1, wherein the injection molding and the guide tube are simultaneously injection-molded in one work step.

11. A quick fastener according to claim 1, wherein the damping rubber is injection-molded on the injection molding, the cable sleeve and the guide tube.

12. A quick fastener according to claim 2, wherein the pressure piece, the closure piece, the housing, the guide tube and the guide bush are made of plastic.

* * * * *